(12) United States Patent
Yvon et al.

(10) Patent No.: US 7,755,622 B2
(45) Date of Patent: Jul. 13, 2010

(54) FLATTENING A THREE-DIMENSIONAL WIRE HARNESS REPRESENTATION TO TWO DIMENSIONS

(76) Inventors: Jean-Mark Yvon, Mentor House, Edward Court, Altrincham Business Park, Altrincham (GB); Mark Colonnese, Mentor House, Edward Court, Altrincham Business Park, Altrincham (GB); Steven Trythall, Mentor House, Edward Court, Altrincham Business Park, Altrincham (GB)

( * ) Notice: Subject to any disclaimer, the term of this patent is extended or adjusted under 35 U.S.C. 154(b) by 403 days.

(21) Appl. No.: 11/818,170

(22) Filed: Jun. 12, 2007

(65) Prior Publication Data
US 2007/0247456 A1    Oct. 25, 2007

Related U.S. Application Data

(63) Continuation of application No. PCT/EP2006/069551, filed on Dec. 11, 2006.

(60) Provisional application No. 60/751,342, filed on Dec. 16, 2005.

(51) Int. Cl.
G06T 17/00    (2006.01)
G06T 15/10    (2006.01)
G06F 17/50    (2006.01)

(52) U.S. Cl. .................. 345/420; 716/1; 345/427

(58) Field of Classification Search ............... None
See application file for complete search history.

(56) References Cited

U.S. PATENT DOCUMENTS 5,506,950 A * 4/1996 Hughes et al. ............... 345/420

6,721,614 B2 * 4/2004 Duncan et al. ............... 700/97
6,970,755 B2 * 11/2005 Sakakura et al. ............. 700/97
7,164,957 B2 * 1/2007 Tsuchiya et al. ............. 700/97

(Continued)

FOREIGN PATENT DOCUMENTS

DE    43 17 688    8/1994

(Continued)

OTHER PUBLICATIONS

Sing Bing Kang, Andrew Johnson, and Richard Szeliski, "Extraction of Concise and Realistic 3-D Models from Real Data," Digital Equipment Corporation Cambridge Research Lab, Technical Report CRL 95/7, [online], Oct. 1995 [retrieved on Aug. 15, 2009]. Retrieved from the Internet: <URL: http://www.hpl.hp.com/techreports/Compaq-DEC/CRL-95-7.pdf>.*

(Continued)

Primary Examiner—Jason M Repko
(74) Attorney, Agent, or Firm—Klarquist Sparkman, LLP

(57) ABSTRACT

A method and system are described that allow conversion of a three-dimensional representation of a wire harness to a two-dimensional representation. In one aspect, an optimal viewing angle of the three-dimensional representation is automatically computed such that overlap of nodes and/or branches is minimized. Using the optimal viewing angle, the three-dimensional representation is converted to two dimensions.

In another aspect, the optimal viewing angle is obtained through rotation of the three-dimensional data. One technique for performing such a rotation is by determining a plane associated with the viewing angle, the plane being such that the average distance from nodes in the wire harness to the plane is a minimum.

14 Claims, 11 Drawing Sheets

U.S. PATENT DOCUMENTS 7,200,537 B2 * 4/2007 Ozaki ............................ 703/7
2005/0091628 A1 4/2005 Kragh et al.

FOREIGN PATENT DOCUMENTS

EP            1 275 565       1/2003

OTHER PUBLICATIONS

Written Opinion and International Search Report for PCT/EP2006/069551, filed Dec. 11, 2006.
Alibozek, Tim, "Smart software builds a better harness," *Machine Design*, vol. 70, No. 8, pp. 89-92 (May 7, 1998).
Wittmann-Regis, A., International Preliminary Report on Patentability for PCT/EP2006/069551, 7 pp., Jun. 18, 2008.

* cited by examiner

FLATTENING A THREE-DIMENSIONAL WIRE HARNESS REPRESENTATION TO TWO DIMENSIONS

CROSS REFERENCE TO RELATED APPLICATION DATA

This application is a continuation of co-pending International Patent Application No. PCT/EP2006/069551, filed Dec. 11, 2006, which claims the benefit of U.S. Provisional Patent Application No. 60/751,342, filed Dec. 16, 2005, both of which are hereby incorporated by reference.

FIELD OF THE INVENTION

The present invention generally relates to the design of wire harnesses, and, more particularly, to flattening a three-dimensional wire harness representation to two dimensions.

BACKGROUND

Wire harnesses include a bundle of insulated conductors bound together, for example, by helically wound tape to produce an arrangement that is compact and easy to manage. Wire harnesses may be used in a variety of applications to electrically interconnect components of a product. For example in an automobile, a harness may allow connections to the dash board, head lights, battery, tail lights, etc.

Design of a wire harness takes place in both three-dimensions and two-dimensions. A three-dimensional (3D) mechanical computer aided design (MCAD) system is used to hold the geometry definition of the harness. However, much of the actual design, engineering, pre-production, preparation of costs, and bills of material are all completed in a separate two-dimensional (2D), electrical computer aided design (ECAD) system. Typically, the geometric harness data may be exported from the 3D system to the 2D system, which engineers use to finish the design. For example, the 2D system has a component library and tools needed to solve logical (rather than geometrical) problems.

It is desirable to obtain 2D drawings of the system, which are used for a variety of purposes including creating a layout of an assembly board used to manufacture the wire harness. For this reason, MCAD systems generally include a "mechanical flattening" program for converting the 3D geometric harness data to 2D. Such flattening programs take into account mechanical constraints, such as the flexibility of the wires and torsional constraints, in producing the 2D image. However, these mechanical flattening programs are very slow and error prone.

Another option to obtain a 2D drawing is to export the 3D data to a 2D system and perform the flattening in the 2D system. Indeed, such systems exist, but only remove the Z component of the 3D data. The result is that there are many overlapping nodes and branches that hamper the visualization of the harness in 2D. Such overlaps may be manually adjusted, but this also is a slow process and does not provide ideal results.

Thus, it is desirable to produce a flattening system that generates a clean and esthetically pleasing view of a harness in 2D.

SUMMARY

A method and system are described that allow conversion of a three-dimensional representation of a wire harness to a two-dimensional representation.

In one aspect, an optimal viewing angle of the three-dimensional representation is automatically computed such that overlap of nodes and/or branches is minimized. The three-dimensional representation is converted to two dimensions using the optimal viewing angle.

In another aspect, the optimal viewing angle is obtained through rotation of the three-dimensional data. One technique for performing such a rotation is by determining a plane associated with the viewing angle, the plane being such that the average distance from nodes in the wire harness to the plane is a minimum.

These features and others of the described embodiments will be more readily apparent from the following detailed description, which proceeds with reference to the accompanying drawings.

DETAILED DESCRIPTION

Figure 1:
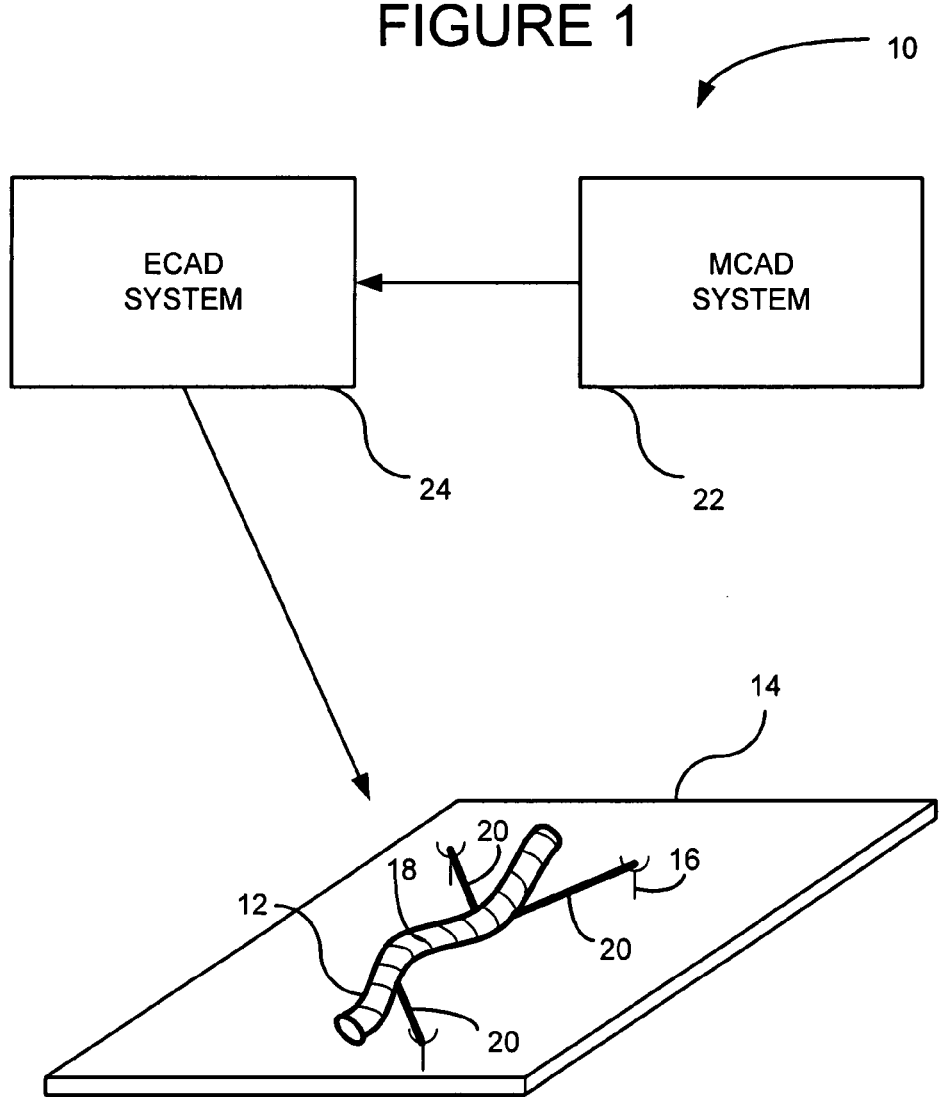
FIG. 1 is a system view showing a three-dimensional MCAD system and a two-dimensional ECAD system used to create a wire harness.

FIG. 1 shows a system 10 used to create a wire harness 12. The wire harness 12 is shown positioned on a typical assembly board 14 and held in place by supporting jigs 16 in accordance with two-dimensional drawings. The wire harness is formed by multiple branches including a backbone branch 18 and various sub-branches 20. The design of the wire harness occurs in both a three-dimensional MCAD system 22 and in a ECAD system 24. The master data for the geometry definition of the harness is in three-dimensions in the MCAD system 22. However, to finish the detailing of the wire harness the 3D data is exported to the ECAD system 24 where further design, pre-production, preparing costs, a bill of materials, etc. are performed. It is within the ECAD system that a two-dimensional drawing is desirable in order to understand what the harness comprises and help build a design process around it. Additionally, the two-dimensional representation helps produce a full-scale representation of the layout of the board 14 on which the wire harness will be built.

Figure 2:
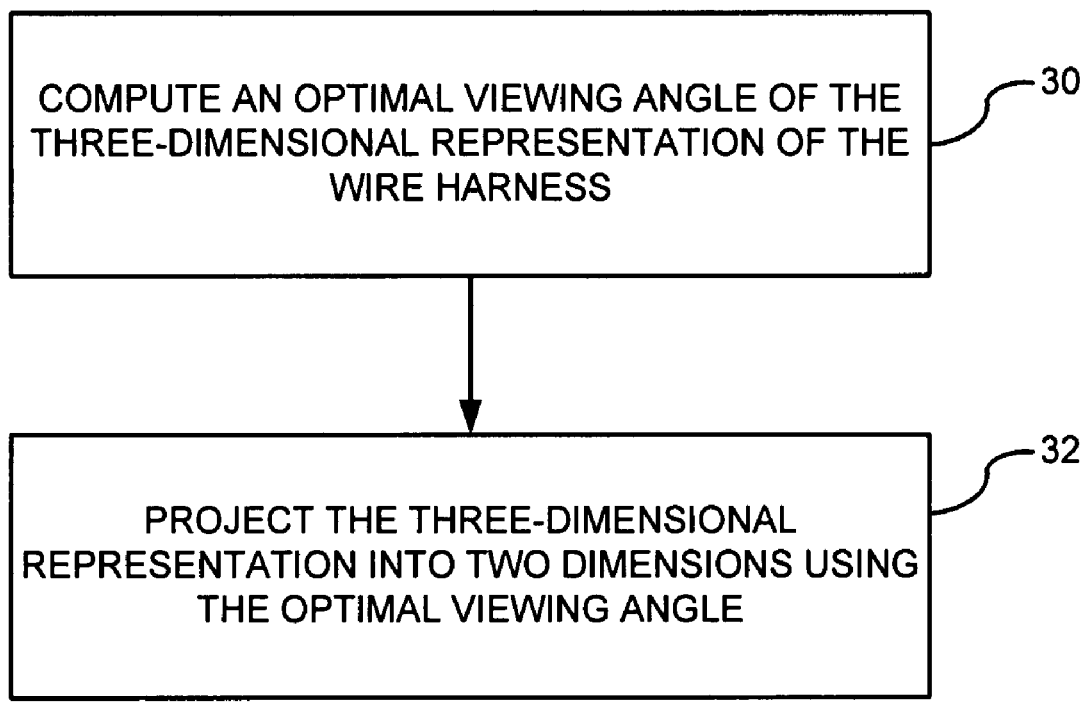
FIG. 2 shows a flowchart of a method for creating a two-dimensional view of the wire harness from an optimal viewing angle.

FIG. 2 shows a flowchart of a method for generating the two-dimensional representation of the wire harness. In process box 30, an optimal viewing angle of the three-dimensional data is computed. Preferably, with an optimal viewing angle, node and branch overlap in the two-dimensional drawing is reduced. Prior art systems simply leave the three-dimensional data in whatever angle it was rendered and removed the Z dimension in order to flatten the image, which resulted in node and branch overlap. In process box 32, the wire harness, which is rotated to its optimal viewing angle, is projected into two dimensions. The resulting two-dimensional representation, which is not necessarily to scale, has minimized node and branch overlap.

Figure 3:
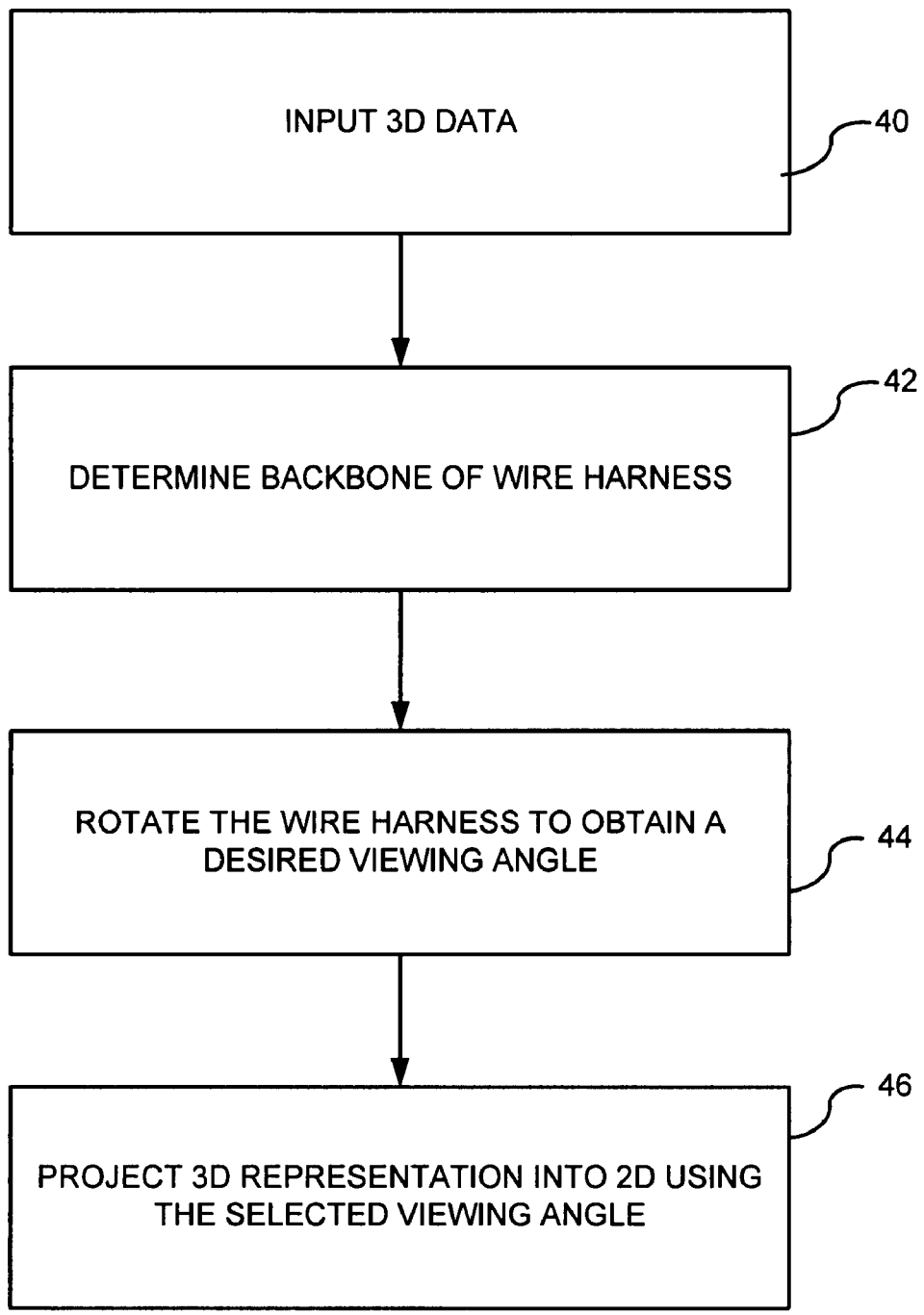
FIG. 3 is a more detailed flowchart of a method for creating the two-dimensional view of FIG. 2.

FIG. 3 shows further details of how the optimal viewing angle is achieved. In particular, in process block 40, the 3D data is received in the ECAD system 24 through an import from the MCAD system 22. In process block 42, a backbone of the wire harness is determined. The backbone of the wire harness may be defined in many ways including the branches having the largest number of wires, the branches that have the largest number of sub-branches, etc. FIGS. 4-7 give further details and specific examples of how the backbone is determined. In process block 44, the three-dimensional representation is rotated to obtain the optimal viewing angle. The rotation is described further in FIG. 8 and should not be interpreted so narrowly as if an image is physically rotated. Indeed, rotation of the data is a computation within a computer and such computation is better visualized as a rotation. In any event, one can imagine that rotating a wire harness with multiple branches there are some views better than others for conveying what the wire harness looks like. In process block 46, the rotated wire harness is projected into two dimensions. This projection is explained more fully in FIG. 9.

Figure 4:
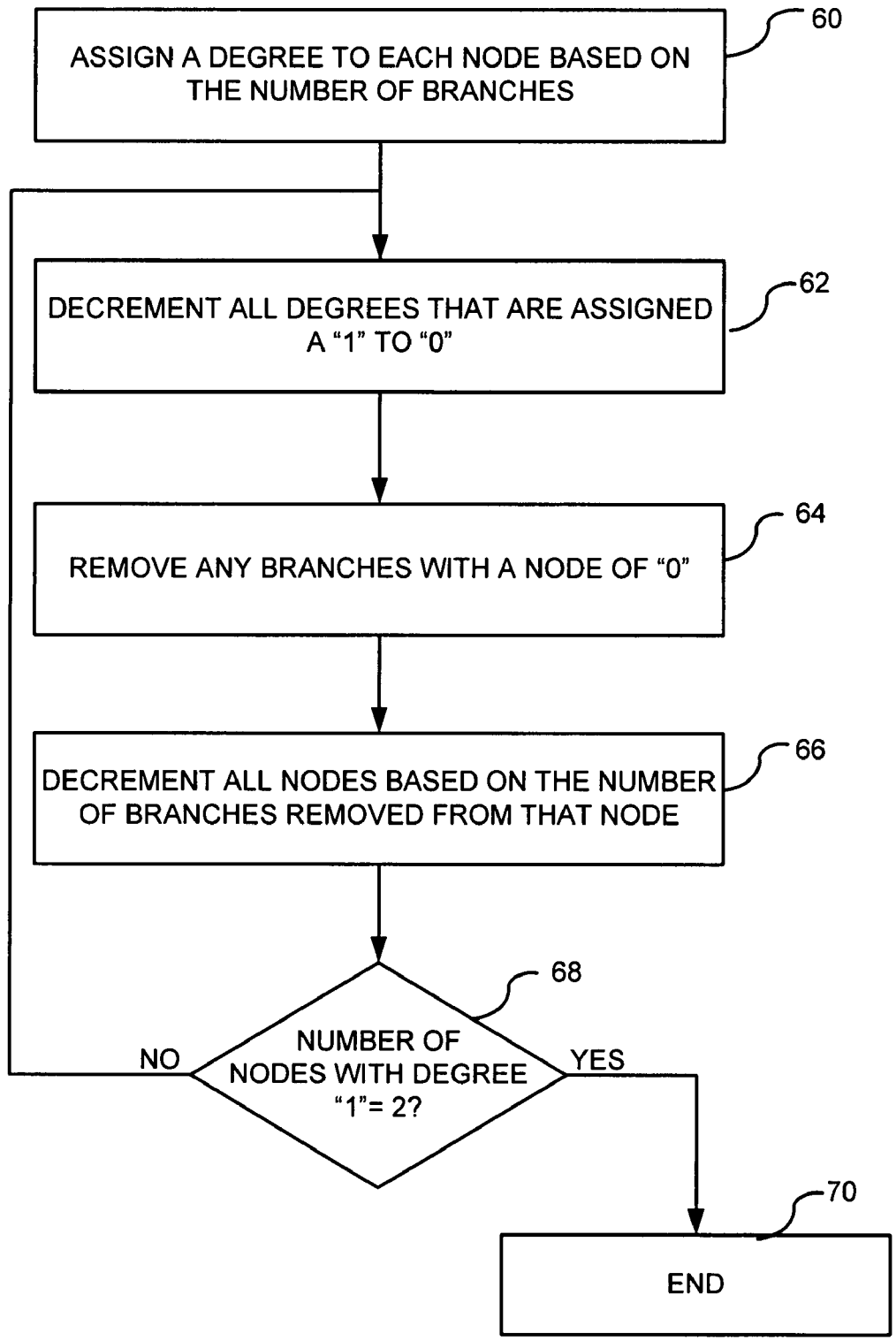
FIG. 4 is a flowchart of a method for finding a backbone of a wire harness.

FIG. 4 shows a flowchart of a method for determining the backbone of the wire harness. In process block 60, a degree (e.g., a number) is assigned to each node. The degree is representative of the number of branches connected to the node. In process block 62, all degrees that have a value of "1" are decremented to "0" and removed (process block 64). In process block 66, all degrees associated with the nodes are decremented an amount equal to the number of branches that were removed from that node. In process block 68, a check is made to determine whether there are two nodes that have a degree equal to "1". If so, the method ends at process block 70. In not, the process continues and is repeated starting with process block 62.

Figure 5:
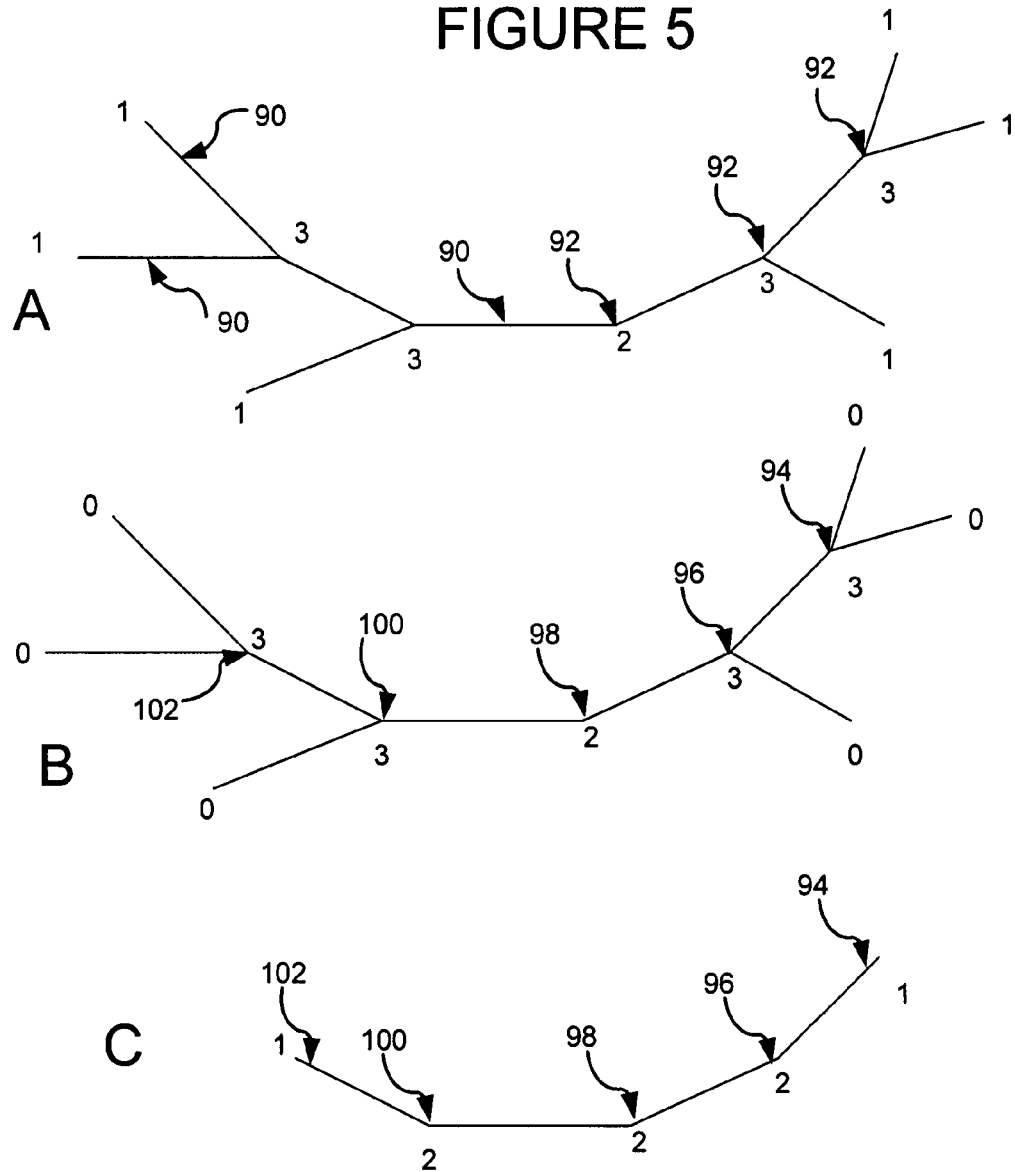
FIG. 5 is a particular example showing how the backbone is determined using the method of FIG. 4.

FIG. 5 is an example of backbone selection using the method of FIG. 4. The sequence of progression is illustrated by the letters "A", "B" and "C". The wire harness designated by the letter "A" is a pictorial view of 3D data supplied by the MCAD system and shows multiple branches, some of which are shown generically at 90. The branches are separated by nodes, some of which are shown generally at 92, and have a number associated therewith indicative of the number of branches entering the node. End nodes are designated with a "1". Process block 62 of FIG. 4 explains that all nodes with a degree "1" are reduced to degree "0". Thus, as shown at "B" in FIG. 5, the end nodes are reduced to "0". Corresponding to process block 64, all branches with a "0" are removed resulting in the final stage "C" in the progression. Additionally, corresponding to process block 66, the degree of each node is reduced according to the number of branches removed. Comparing B and C, node 94 had two branches removed. Thus, node 94 is reduced by 2; node 96 is reduced by 1; node 98 remains unchanged; node 100 is reduced by 1; and node 102 is reduced by 2. Once there are two nodes having a degree of "1", the method is finished and the result is the determined backbone of the wire harness.

Figure 6:
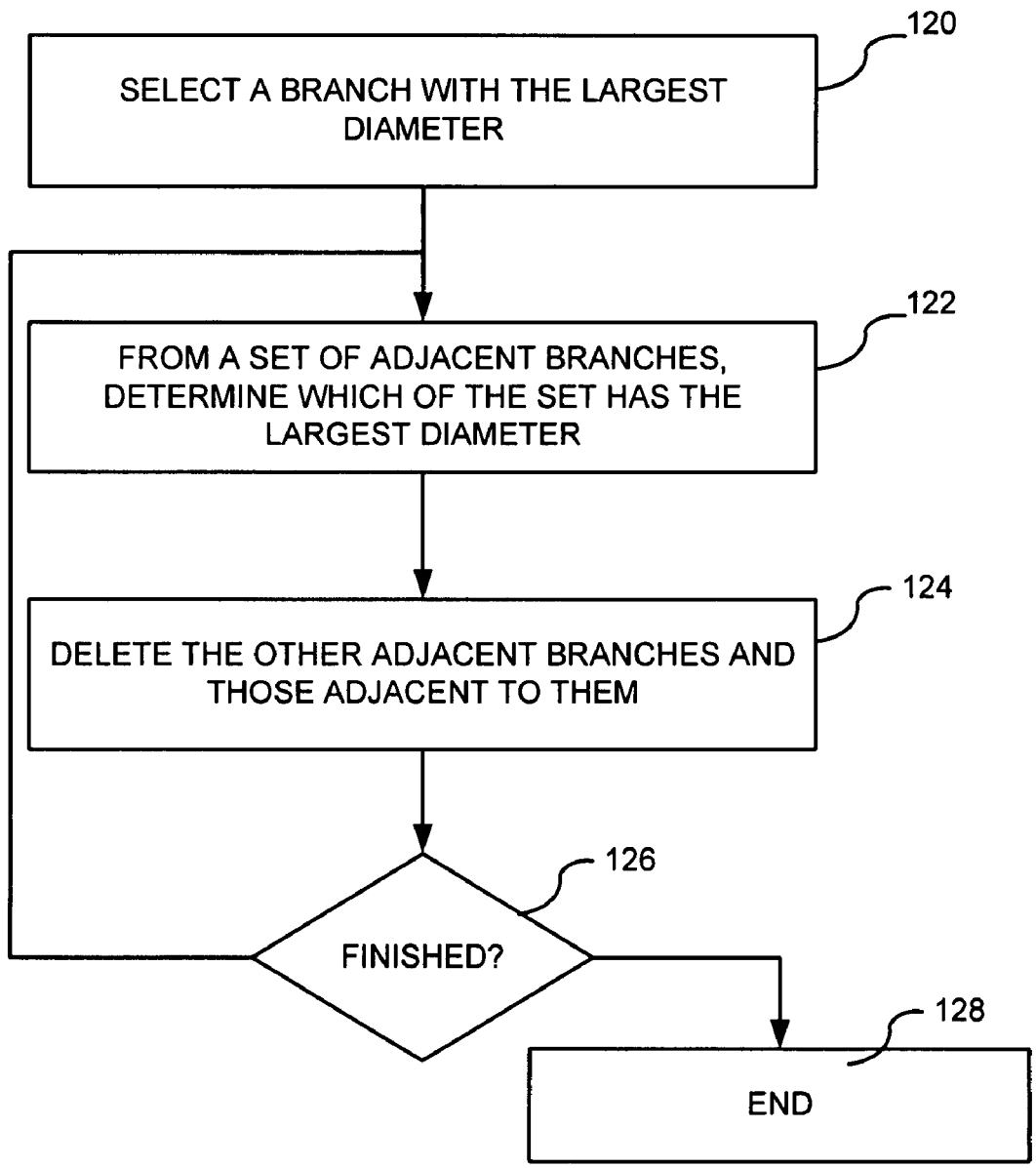
FIG. 6 is another flowchart of a method for finding a backbone of a wire harness.

FIG. 6 shows another method for determining a backbone of a wire harness. In process block 120, a branch is selected with the largest diameter in the wire harness. In process block 122, opposing end nodes of the largest branch are separately analyzed to determine which are the largest branches coupled to each end node. All other branches are deleted (process block 124). In decision block 126, an analysis is done to see if every node in the wire harness has been considered. If yes, then the method ends at 128. If not, then each of the non-deleted branches is analyzed in the same way as the largest branch.

Figure 7:
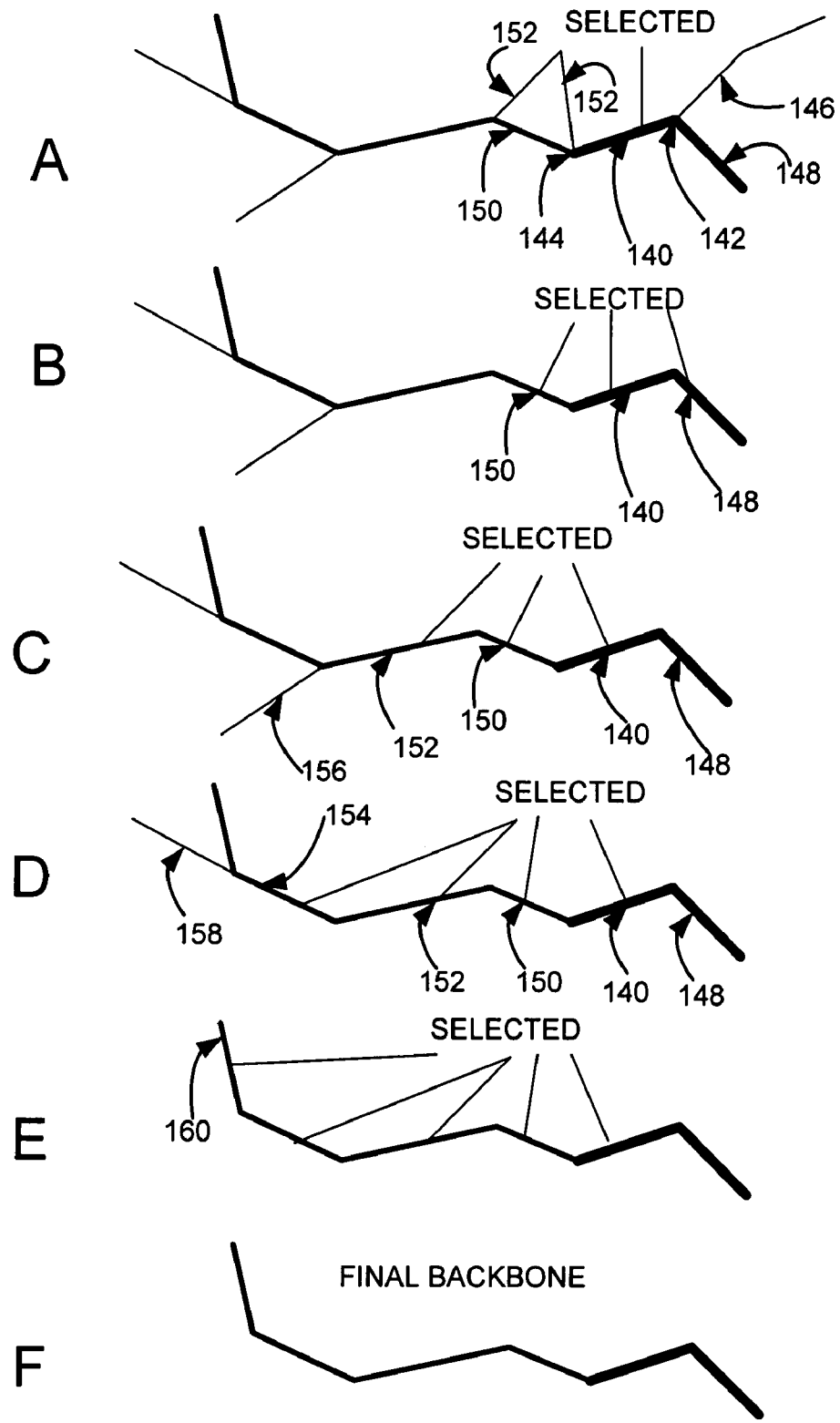
FIG. 7 is a particular example showing how the backbone is determined using the method of FIG. 6.

FIG. 7 shows a progression of selecting a backbone of a wire harness according to the method of FIG. 6. Corresponding to process block 120 in FIG. 6, the branch with the largest diameter is selected first as shown at 140. Branch 140 has two opposing nodes 142 and 144. Starting with node 142, there are two branches 146 and 148 extending there from. Branch 148 is determined to be of a larger diameter so branch 146 and any branches connected thereto are deleted. As for node 144, branch 150 is determined to have the largest diameter and branches 152 and 154 are deleted. The result is shown at "B" with branches 140, 148 and 150 selected. Branch 148 is an end branch, so no further analysis is needed on the right side of the wire harness. On the left side, there is only one branch 152, so it is selected as having the largest diameter as shown at "C". As shown at "D", branch 154 is selected and 156 is deleted. Finally, at "E", branch 160 is selected and branch 158 is deleted. The final backbone is shown at "F".

Figure 8:
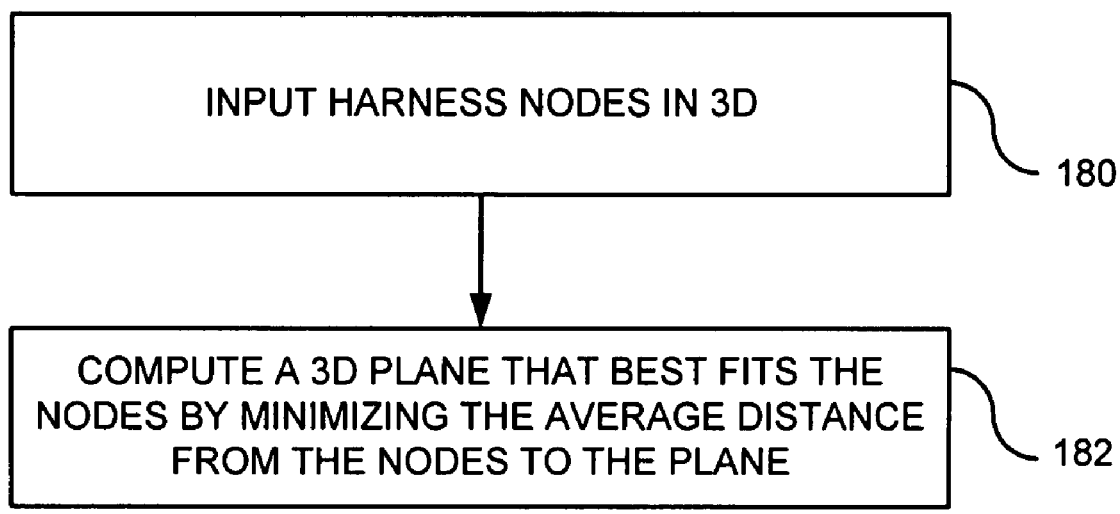
FIG. 8 is a flowchart of a method for obtaining the optimal viewing angle.

FIG. 8 shows a method for computing an optimal viewing angle through determination of a plane onto which the wire harness can be projected. Such a determination is like rotating the wire harness to obtain the optimal viewing angle. In process box 180, the 3D wire harness data is input including the nodes. In process box 182, a 3D plane is computed that best fits the nodes by minimizing the average distance from the nodes to the plane. The computation is based on standard matrix algebra. Another way to envision the determination of the plane is to imagine the wire harness as a cloud of nodes. A plane is placed through the cloud of nodes and is rotated until the root square means are minimized for the distances from each node to the plane.

Figure 9:
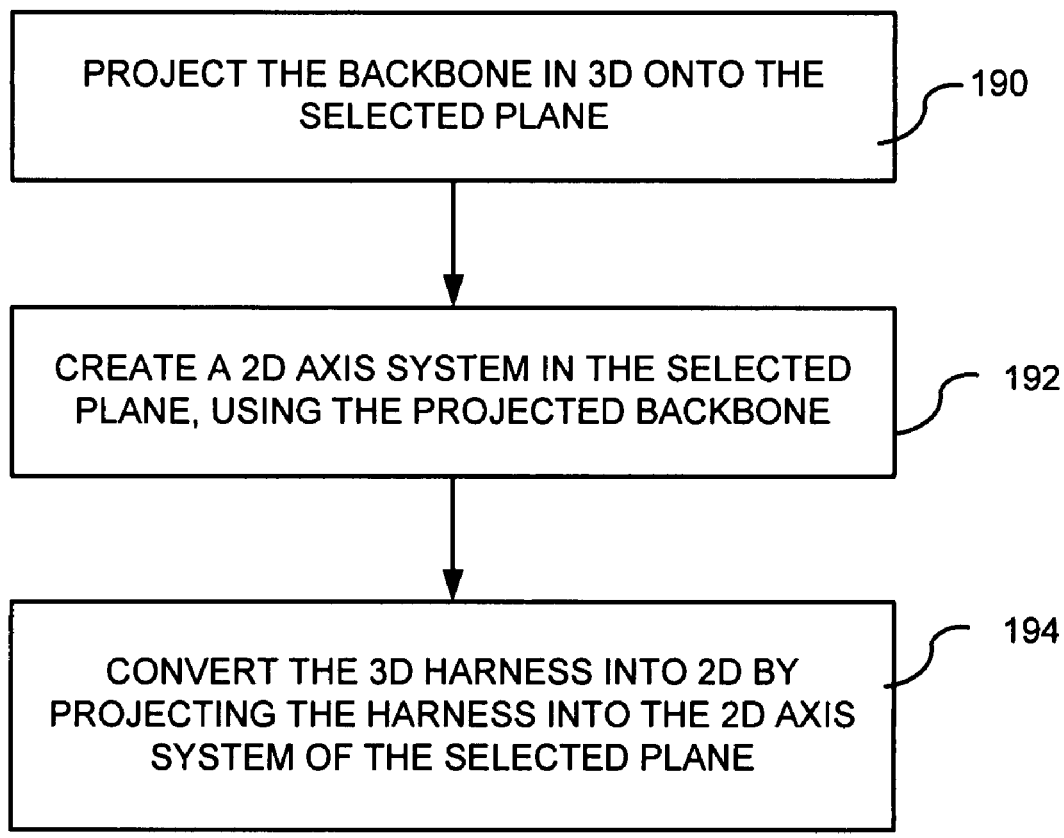
FIG. 9 is a flowchart of a method for projecting the three-dimensional wire harness into two dimensions.

FIG. 9 shows a flowchart of a method for projecting the three-dimensional representation into two dimensions. In process block 190, the backbone is projected onto the plane that was determined in FIG. 8. In process block 192, a 2D axis system is determined. In general, to obtain a first direction of the 2D axis system, the end points of the backbone are projected onto the plane and joined with a single, straight-line segment, called vector U. This vector U is considered the main direction of the wire harness. The second direction of the 2D axis system is obtained by a vector cross product between the normal to the plane, N, and U: thus, V=N*U. In process block 194, the nodes in the wire harness are projected onto the 2D axis system. This projection simply means that each node of the harness is converted into the new axis system and the Z component is removed to make it two-dimensional.

Figure 10:
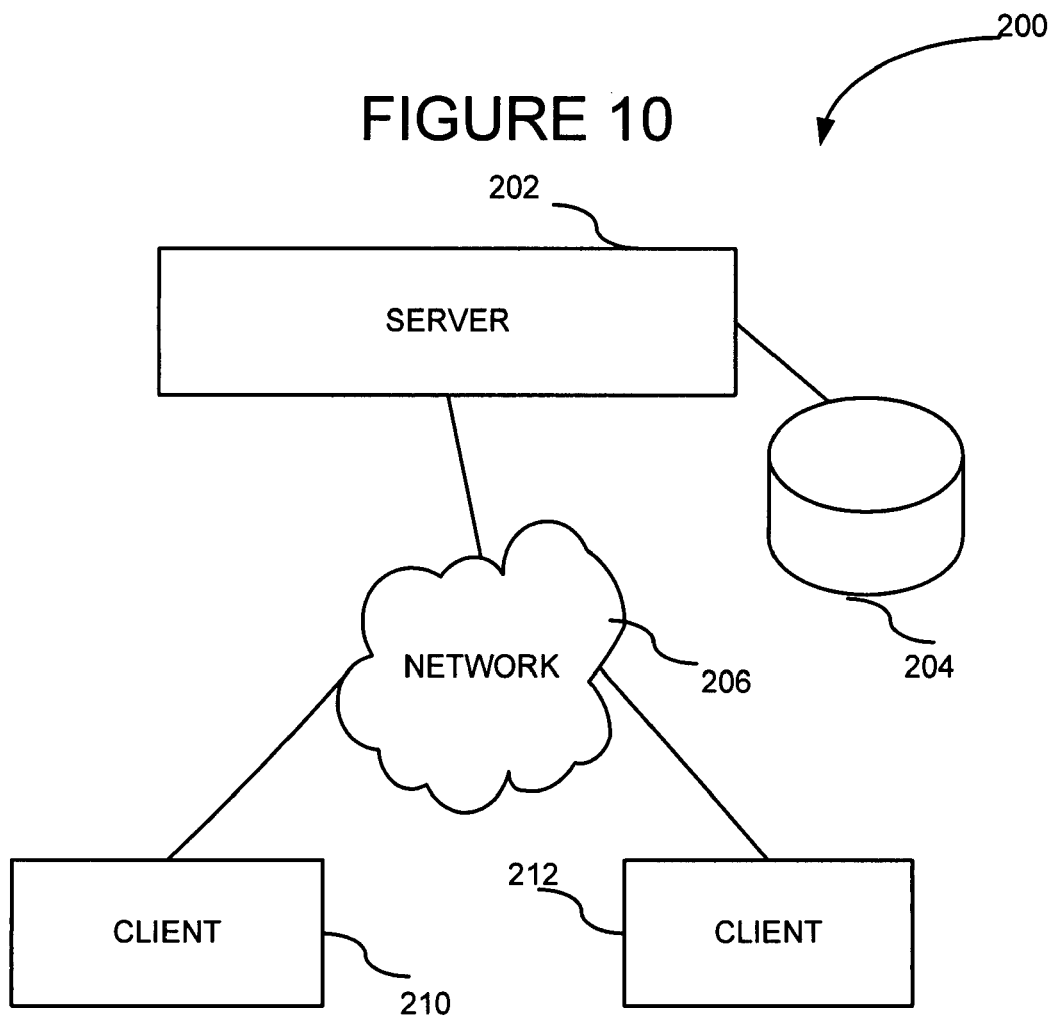
FIG. 10 is a system view of a network that may be used in conjunction with the system and method.

FIG. 10 shows that portions of the system 200 may be applied to a distributed network, such as the Internet. For example, a server computer 202 may have an associated database 204 (internal or external to the server computer). The server computer is coupled to a network shown generally at 206. One or more client computers, such as those shown at 210 and 212, are coupled to the network to interface with the server computer using a network protocol.

Figure 11:
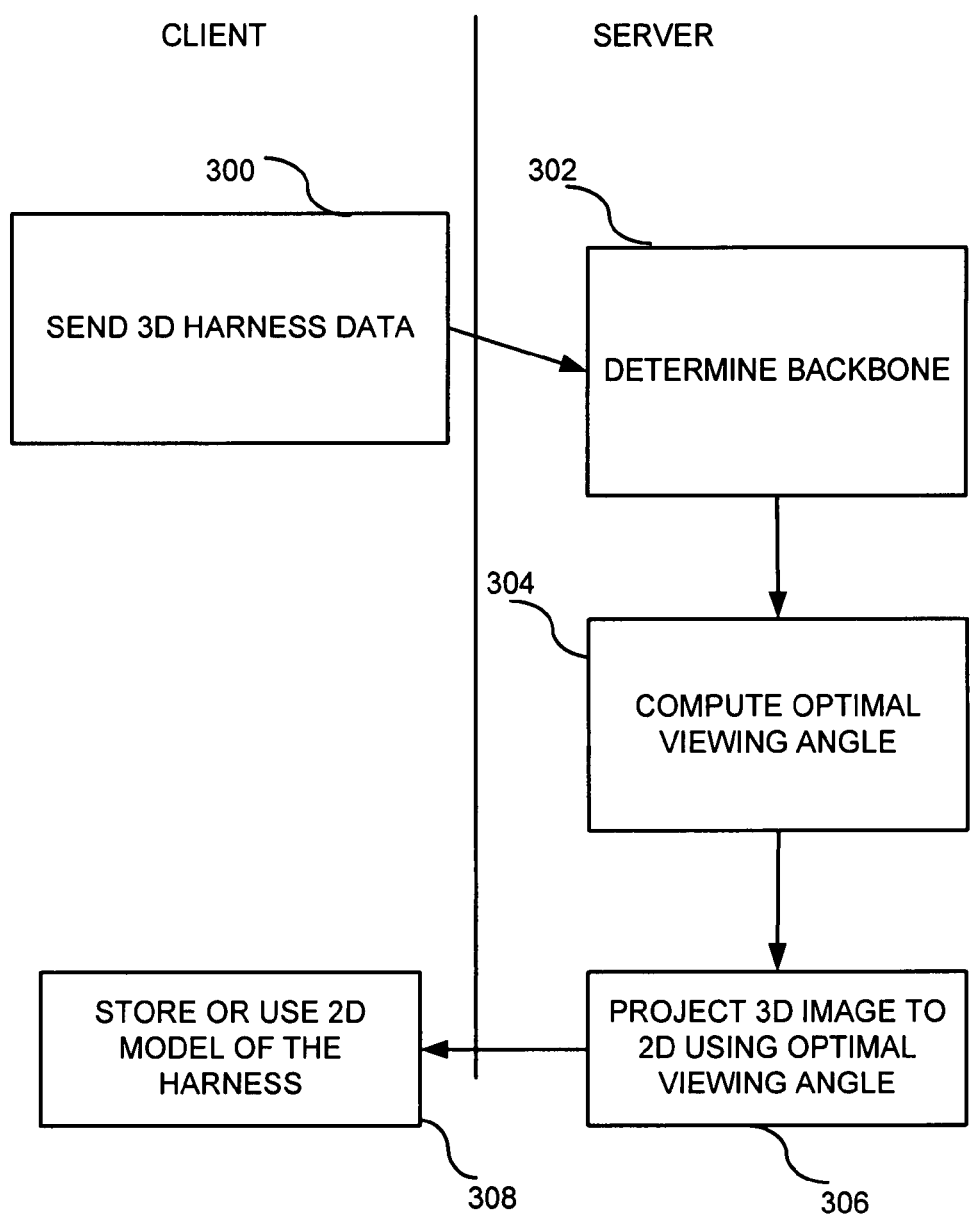
FIG. 11 shows the method being applied on the network of FIG. 10.

FIG. 11 shows a flow diagram using the method on the network of FIG. 10. In process block 300, the 3D wire harness data is sent from a client computer, such as 210, to the server computer 202. In process block 302, the backbone is determined using any desired method. In process block 304, the optimal viewing angle of the wire harness is determined. In process block 306 the wire harness is projected into 2D. In process block 308, the results are used or displayed to the user on the client computer.

Another feature that the system and method may incorporate is called "tilting". Despite the provision for the best fit plane computation, there will be harnesses where nodes are too close for proper visualization. The tilting feature compares if the nodes are less than a pre-determined minimum and, if so, moves one of them in a pre-determined direction. The distance that the node is moved from the other node depends on the difference in distance between the nodes in the new Z direction. Thus, the greater the difference in the Z direction in the 3D data, the further apart the nodes are moved in 2D.

Having illustrated and described the principles of the illustrated embodiments, it will be apparent to those skilled in the art that the embodiments can be modified in arrangement and detail without departing from such principles.

For example, there are numerous techniques for determining the optimal viewing angle, such as by using a method that maximizes surface area or by using a method that minimizes cross over.

In view of the many possible embodiments, it will be recognized that the illustrated embodiments include only examples of the invention and should not be taken as a limitation on the scope of the invention. Rather, the invention is defined by the following claims. We therefore claim as the invention all such embodiments that come within the scope of these claims.

We claim:

1. A method to convert a three-dimensional representation of a wire harness to a two-dimensional representation, comprising:
   automatically computing, using a computer, an optimal viewing angle of the three-dimensional representation of the wire harness, the viewing angle being such that minimizes overlap in two dimensions;
   projecting the three-dimensional representation of the wire harness in two dimensions using the computed viewing angle;
   wherein the three-dimensional representation of the wire harness includes a plurality of branches comprising a main backbone and multiple sub-branches coupled to the main backbone, and the method further includes determining which branches form the main backbone; and
   wherein determining the main backbone includes:
   a) assigning a degree to each node based on the number of branches coupled to that node;
   b) decrementing all degrees that are assigned a "1" to a "0";
   c) removing any branches with a node having a degree of "0";
   d) decrementing all nodes based on the number of branches removed from the node; and
   e) re-performing (a)-(d) until the number of nodes with degree "1" equals two.

2. The method of claim 1, wherein automatically computing the optimal viewing angle includes determining a plane associated with a viewing angle.

3. The method of claim 2, wherein the determined plane is one that minimizes a root square mean between nodes in the wire harness and the plane.

4. The method of claim 1, further including receiving the three-dimensional representation from a MCAD system and wherein the projecting is performed in an ECAD system.

5. The method of claim 1, wherein projecting the three dimensional representation of a wire harness in two dimensions includes:
   a) projecting a backbone of the three-dimensional representation of the wire harness onto a plane;
   b) using the projected backbone to create a two-dimensional axis system in the plane; and
   c) projecting the three-dimensional representation of a wire harness into two dimensions by projection onto the two-dimensional axis system.

6. A method to convert a three-dimensional representation of a wire harness to a two-dimensional representation, comprising:
   automatically computing, using a computer, an optimal viewing angle of the three-dimensional representation of the wire harness, the viewing angle being such that minimizes overlap in two dimensions;
   projecting the three-dimensional representation of a wire harness in two dimensions using the computed viewing angle;
   wherein the three-dimensional representation of the wire harness includes a plurality of branches comprising a main backbone and multiple sub-branches coupled to the main backbone, and the method further includes determining which branches form the main backbone; and
   wherein determining the main backbone includes:
   a) selecting a branch with the largest diameter as a starting point;
   b) determining a set of sub-branches coupled to the selected branch;
   c) from the set of sub-branches, determining which has the largest diameter and deleting the other sub-branches in the set; and
   d) re-perform (a)-(c) until each branch in the wire harness has been analyzed.

7. The method of claim 6, wherein automatically computing the optimal viewing angle includes determining a plane associated with a viewing angle.

8. The method of claim 7, wherein the determined plane is one that minimizes a root square mean between nodes in the wire harness and the plane.

9. The method of claim 6, further including automatically determining a main direction of the wire harness.

10. The method of claim 6, further including receiving the three-dimensional representation from a MCAD system and wherein the projecting is performed in an ECAD system.

11. The method of claim 6, wherein projecting the three dimensional representation of a wire harness in two dimensions includes:
    a) projecting a backbone of the three-dimensional representation of the wire harness onto a plane;
    b) using the projected backbone to create a two-dimensional axis system in the plane; and
    c) projecting the three-dimensional representation of a wire harness into two dimensions by projection onto the two-dimensional axis system.

12. The method of claim 6, further including comparing if nodes of the wire harness in two dimensions are within a distance less than a threshold and, if so, automatically moving one of the nodes.

13. The method of claim 12, wherein the distance that the node is moved relates to the distance that the nodes are apart in the optimal view direction of the 3D representation.

14. The method of claim 6, determining nodes of the three-dimensional wire harness and determining a plane passing through the nodes that minimizes an average distance between the nodes and the plane.

* * * * *